United States Patent
Henderson et al.

(10) Patent No.: US 10,810,100 B2
(45) Date of Patent: Oct. 20, 2020

(54) PROVIDING DYNAMIC INSTRUMENTATION USING DOMAIN-SPECIFIC MONITORING-LANGUAGE-TO-KERNEL-BYTECODE COMPILATION

(71) Applicant: Red Hat, Inc., Raleigh, NC (US)

(72) Inventors: Richard T. Henderson, Olympia, WA (US); Frank Ch. Eigler, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 121 days.

(21) Appl. No.: 15/402,777

(22) Filed: Jan. 10, 2017

(65) Prior Publication Data
US 2018/0196648 A1 Jul. 12, 2018

(51) Int. Cl.
G06F 8/52 (2018.01)
G06F 11/34 (2006.01)
G06F 11/30 (2006.01)
G06F 11/36 (2006.01)

(52) U.S. Cl.
CPC .......... *G06F 11/34* (2013.01); *G06F 8/52* (2013.01); *G06F 11/302* (2013.01); *G06F 11/3466* (2013.01); *G06F 11/3624* (2013.01); *G06F 11/3636* (2013.01); *G06F 2201/865* (2013.01)

(58) Field of Classification Search
CPC .............. G06F 8/00–78; G06F 11/36–3696
See application file for complete search history.

(56) References Cited

U.S. PATENT DOCUMENTS

| 7,590,975 B1 * | 9/2009 | Shapiro ............... G06F 11/3636 707/999.101 |
| 8,141,056 B2 | 3/2012 | Prasadarao |
| 8,429,394 B1 * | 4/2013 | Natoli ................. G06F 9/44547 713/100 |
| 8,667,298 B2 | 3/2014 | Eigler et al. |

(Continued)

OTHER PUBLICATIONS

Fu, Yangchun, and Zhiqiang Lin. "Space traveling across vm: Automatically bridging the semantic gap in virtual machine introspection via online kernel data redirection." 2012 IEEE symposium on security and privacy. IEEE, 2012. (Year: 2012).*

(Continued)

*Primary Examiner* — Doon Y Chow
*Assistant Examiner* — Joanne G Macasiano
(74) *Attorney, Agent, or Firm* — Withrow & Terranova, PLLC (57) ABSTRACT

Providing dynamic instrumentation using domain-specific monitoring-language-to-kernel-bytecode compilation is disclosed. An instrumentation program file is converted by a compilation engine into multiple bytecode sections. A load and execute engine identifies which sections can be executed in kernel space and which can be executed in user space. The sections to be executed in kernel space are then loaded into a kernel space bytecode interpreter for execution, while the sections to be executed in user space are concurrently executed by a user space bytecode interpreter of the load and execute engine. In some examples, the load and execute engine may provide global variables that are accessible by both the kernel space and the user space, and that facilitate data exchange between the kernel space bytecode interpreter and the user space bytecode interpreter.

15 Claims, 5 Drawing Sheets

(56) References Cited

U.S. PATENT DOCUMENTS

| | | | |
|---|---|---|---|
| 8,793,659 B2 | 7/2014 | Muller et al. | |
| 2004/0172221 A1* | 9/2004 | Curry, III | G06F 11/0751 702/186 |
| 2005/0028151 A1* | 2/2005 | Roth | G06F 8/447 717/162 |
| 2007/0169070 A1* | 7/2007 | Drepper | G06F 9/45537 717/166 |
| 2009/0307670 A1* | 12/2009 | Kashyap | G06F 8/20 717/135 |
| 2013/0235868 A1* | 9/2013 | Owens | H04L 67/32 370/389 |
| 2015/0106572 A1 | 4/2015 | Stone et al. | |
| 2015/0135167 A1 | 5/2015 | Berk et al. | |
| 2015/0347272 A1* | 12/2015 | Berk | G06F 11/3644 717/128 |
| 2016/0364231 A1* | 12/2016 | Tati | G06F 8/656 |

OTHER PUBLICATIONS

Eigler, Frank Ch, and Red Hat. "Problem solving with systemtap." Proc. of the Ottawa Linux Symposium. p. 261-268. 2006. (Year: 2006).*

Kplugs, http://www.kplugs.org, Archived Oct. 16, 2014. Retrieved Jun. 7, 2020 (Year: 2014).*

Author Unknown, "[RFC Patch v2 00/26] perf tools: Support uBPF script," Mailing List Archive: Linux: Kernel, Last Post: Jun. 29, 2016, 14 pages, http://www.gossamer-threads.com/lists/linux/kernel/2471019?search_string=v2%2000%2F26;#2471019.

Author Unknown, "SystemtapDtraceComparison," Systemtap Wiki, Last Edited: Apr. 28, 2015, 3 pages, https://sourceware.org/systemtap/wiki/SystemtapDtraceComparison.

Gregg, Brendan, "eBPF: One Small Step," Brendan Gregg's Blog, May 15, 2015, 6 pages, http://www.brendangregg.com/blog/2015-05-15/ebpf-one-small-step.html.

Le Bigot, Jean-Tiare, "How to turn any syscall into an event: Introducing eBPF Kernel probes," Yadutaf's Blog, Mar. 30, 2016, 10 pages, https://blog.yadutaf.fr/2016/03/30/turn-any-syscall-into-event-introducing-ebpf-kernel-probes/.

Sharma, Suchakra, "Linux Networking, Tracing and IO Visor, a New Systems Performance Tool for a Distributed World," The New Stack, Sep. 28, 2015, 6 pages, http://thenewstack.io/comparing-dtrace-iovisor-new-systems-performance-platform-advance-linux-networking-virtualization/.

Suo, Kun et al., "Time Capsule: Tracing Packet Latency across Different Layers in Virtualized Systems," APSys '16, Aug. 4-5, 2016, Hong Kong, China, ACM, 9 pages.

* cited by examiner

PROVIDING DYNAMIC INSTRUMENTATION USING DOMAIN-SPECIFIC MONITORING-LANGUAGE-TO-KERNEL-BYTECODE COMPILATION

TECHNICAL FIELD

The examples relate generally to instrumentation of kernel-based operating systems, and, in particular, to mechanisms for enabling dynamic instrumentation using domain-specific monitoring languages.

BACKGROUND

Kernel-based operating systems provide instrumentation tools and domain-specific scripting languages for dynamically monitoring and manipulating executing processes, and extracting data that is useful for summarizing system performance and diagnosing issues.

SUMMARY

The examples described herein include providing dynamic instrumentation using domain-specific monitoring-language-to-kernel-bytecode compilation. An instrumentation program file (e.g., a script written in the Systemtap domain-specific monitoring language) is converted by a compilation engine into multiple bytecode sections. A load and execute engine identifies which sections can be executed in kernel space and which can be executed in user space. The sections to be executed in kernel space are then loaded into a kernel space bytecode interpreter for execution, while the sections to be executed in user space are concurrently executed by a user space bytecode interpreter of the load and execute engine. In some examples, the load and execute engine may provide global variables that are accessible by both the kernel space and the user space, and that facilitate data exchange between the kernel space bytecode interpreter and the user space bytecode interpreter.

In one example, a method for providing dynamic instrumentation of executing processes is provided. The method includes receiving, by a compilation engine executing on a computing device comprising a processor device, an instrumentation program file. The method further includes translating, by the compilation engine, the instrumentation program file into an executable and linkable file (ELF), the ELF comprising one or more sections of bytecode. The method also includes identifying, by a load and execute engine executing on the computing device, a first section and a second section of the one or more sections of bytecode, wherein the first section is to be executed in a kernel space of the computing device and the second section is to be executed in a user space of the computing device. The method additionally includes loading the first section into the kernel space for execution by a kernel space bytecode interpreter of an executing kernel of the computing device. The method further includes concurrently executing the second section using a user space bytecode interpreter of the load and execute engine.

In another example, a computing device is provided. The computing device includes a memory and a processor device coupled to the memory. The processor device is to receive, using a compilation engine, an instrumentation program file. The processor device is further to translate, using the compilation engine, the instrumentation program file into an ELF, the ELF comprising one or more sections of bytecode. The processor device is also to identify, using a load and execute engine, a first section and a second section of the one or more sections of bytecode, wherein the first section is to be executed in a kernel space of the computing device and the second section is to be executed in a user space of the computing device. The processor device is additionally to load the first section into the kernel space for execution by a kernel space bytecode interpreter of an executing kernel of the computing device. The processor device is further to concurrently execute the second section using a user space bytecode interpreter of the load and execute engine.

In another example, a computer program product for providing dynamic instrumentation of executing processes is provided. The computer program product is stored on a non-transitory computer-readable storage medium, and includes instructions to cause a processor device to receive an instrumentation program file. The instructions are further to translate the instrumentation program file into an ELF, the ELF comprising one or more sections of bytecode. The instructions are also to identify a first section and a second section of the one or more sections of bytecode, wherein the first section is to be executed in a kernel space of a computing device and the second section is to be executed in a user space of the computing device. The instructions are additionally to load the first section into the kernel space for execution by a kernel space bytecode interpreter of an executing kernel of the computing device. The instructions are further to concurrently execute the second section using a user space bytecode interpreter of the load and execute engine.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first section" and "second section," and does not imply a priority, a type, an importance, or other attribute, unless otherwise stated herein. As used herein and in the claims, the articles "a" and "an" in reference to an element refers to "one or more" of the element unless otherwise explicitly specified.

Instrumentation tools, such as Systemtap, enable developers to monitor executing processes using scripts written in domain-specific monitoring languages. Such scripts may be translated into programming languages such as C, and then compiled and loaded in a manner similar to conventional device drivers. Alternatively, the scripts may be translated into bytecode, which is then executed by a kernel-based bytecode interpreter. However, because the bytecode executes within kernel space in memory, the allowable functionality and/or program constructs may be limited.

The examples described herein address aforementioned problems by providing dynamic instrumentation using domain-specific monitoring-language-to-kernel-bytecode compilation. This provides enhanced instrumentation functionality by enabling concurrent execution of both user space and kernel space instrumentation using a common bytecode language. An instrumentation program file (e.g., a Systemtap program file written in the Systemtap domain-specific monitoring language) is converted by a compilation engine into multiple bytecode sections. A load and execute engine identifies which sections can be executed in kernel space and which can be executed in user space. The sections to be executed in kernel space are then loaded into a kernel space bytecode interpreter for execution, while the sections to be executed in user space are concurrently executed by a user space bytecode interpreter of the load and execute engine. In some examples, the load and execute engine may provide global variables that are accessible by both the kernel space and the user space, and that facilitate data exchange between the kernel space bytecode interpreter and the user space bytecode interpreter.

Figure 1:
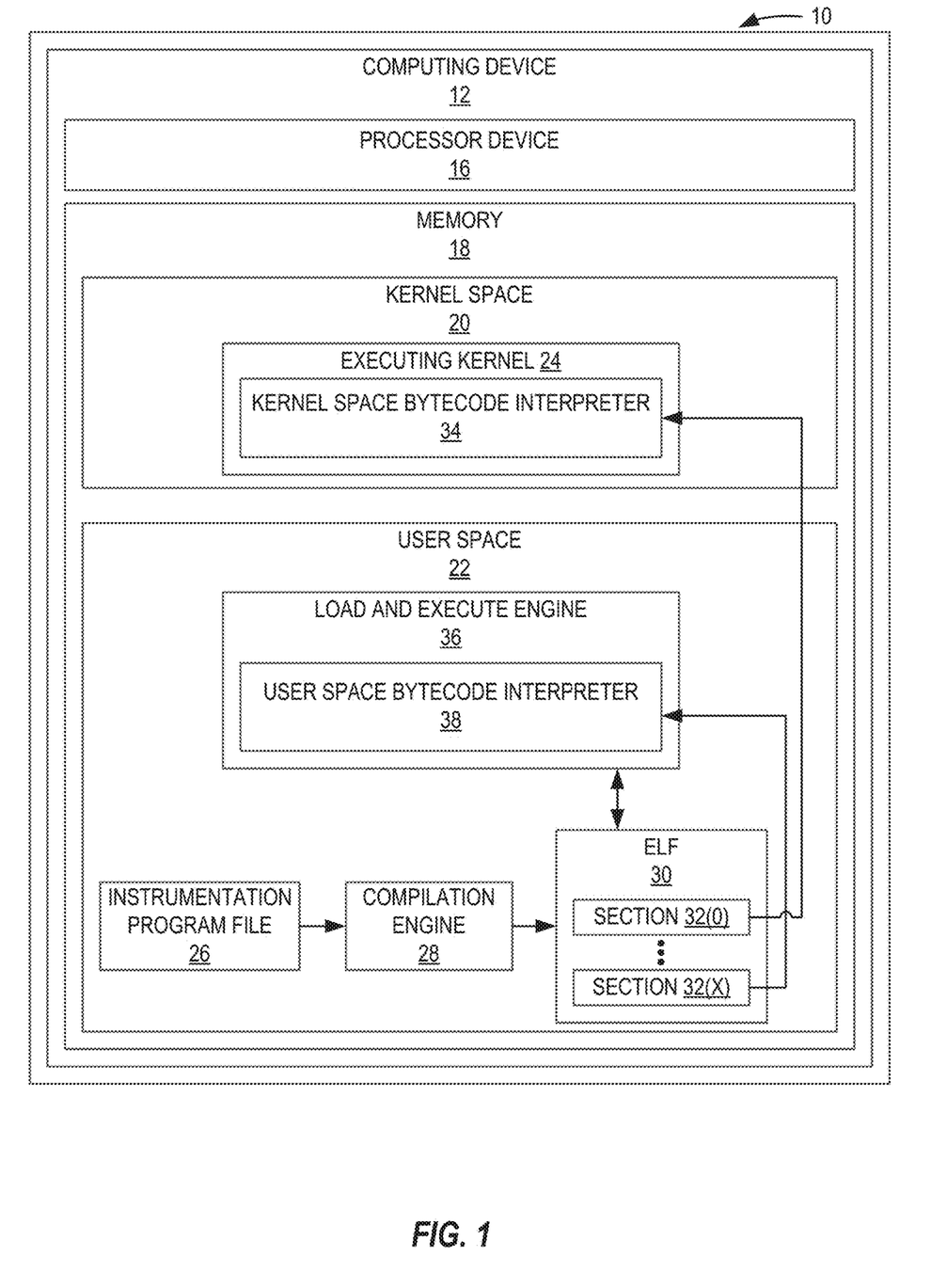
FIG. 1 is a block diagram of a system in which examples may be practiced.

In this regard, FIG. 1 is a block diagram of a processing system 10 in which examples may be practiced. The processing system 10 includes a computing device 12 that includes a processor device 16, and a memory 18. The memory 18 may comprise a random access memory (RAM) such as a dynamic RAM (DRAM), as a non-limiting example. The processing system 10 of FIG. 1 may encompass any one of known digital logic elements, semiconductor circuits, processing cores, and/or memory structures, among other elements, or combinations thereof. Examples described herein are not restricted to any particular arrangement of elements, and thus it is to be understood that some examples of the processing system 10 may include elements in addition to those illustrated in FIG. 1.

As seen in FIG. 1, the memory 18 of the computing device 12 is divided into two regions referred to herein as kernel space 20 and user space 22. The kernel space 20 represents a protected region of memory in which critical operating system kernel code (e.g., an executing kernel 24) is stored and executed, and in which the kernel code performs functionality such as memory management, process execution management, and interrupt handling. The user space 22, in contrast, represents a memory region in which code other than operating system kernel code (e.g., application software) executes. The kernel space 20 is the most privileged memory region, in that the kernel code executing therein has access to all of the memory 18. In contrast, the user space 22 has a lower privilege level, such that processes executing therein can only access the kernel space 20 via system calls. This privileged separation of the memory 18 into the kernel space 20 and the user space 22 effectively segregates kernel data and user data, preventing each from interfering with one another and causing system instability, data loss, or performance degradation.

A set of instrumentation tools, such as Systemtap for Unix systems, is provided for tracing and analyzing executing processes, and filtering data to monitor and measure system performance and diagnose performance issues. An instrumentation program file 26 containing a domain-specific monitoring language (e.g., a script written in the domain-specific SystemTap language) is compiled for execution within the executing kernel 24. The instrumentation program file 26 specifies one or more kernel events, predefined probe points, and/or the execution of specified functions or statements within the kernel space 20 or the user space 22 for monitoring. The instrumentation program file 26 also includes corresponding handler code to be executed upon encountering the specified kernel events, probe points, or specified functions or statements.

In some examples, the instrumentation program file 26 is converted into a programming language such as C, and is then compiled and loaded into the kernel space 20 in a manner similar to loading a conventional device driver. Other examples, such as the example of FIG. 1, provide that the instrumentation program file 26 is compiled by a compilation engine 28 into an executable and linkable file (ELF) 30 containing sections 32(0)-32(X) of bytecode. The bytecode within the ELF 30 is then executed by a kernel space bytecode interpreter 34 within the executing kernel 24. In some examples, the kernel space bytecode interpreter 34 may include an extended Berkeley Packet Filter (eBPF) interpreter.

However, issues may arise when attempting to perform some instrumentation tasks using the kernel space bytecode interpreter 34. Because kernel code executing within the kernel space 20 is privileged, some functionality is limited by the kernel space bytecode interpreter 34. For example, monitoring of certain system events may not be permitted, and/or some program constructs such as loops may be disallowed.

In this regard, the processing system 10 provides the compilation engine 28 and a load and execute engine 36 for enabling instrumentation using both the kernel space bytecode interpreter 34 as well as a user space bytecode interpreter 38 of the load and execute engine 36. As a non-limiting example, the compilation engine 28 may be implemented as a modified version of the Systemtap tool. The user space bytecode interpreter 38 executes the same bytecode as the kernel space bytecode interpreter 34.

The compilation engine 28 receives the instrumentation program file 26 and translates it into the ELF 30, which is then examined by the load and execute engine 36. In particular, the load and execute engine 36 examines the sections 32(0)-32(X) of bytecode within the ELF 30, and identifies which of the sections 32(0)-32(X) (e.g., a first section 32(0)) will be executed within the kernel space 20 and which of the sections 32(0)-32(X) (e.g., a second section 32(X)) will be executed within the user space 22. In some examples, the load and execute engine 36 may identify the first section 32(0) and the second section 32(X) by determining whether the events and/or functionality specified by each of the first section 32(0) and the second section 32(X) require execution in the kernel space 20 or the user space 22. For instance, the load and execute engine 36 may determine that the first section 32(0) requires kernel functionality and thus must execute within the kernel space 20, while the second section 32(X) does not require kernel functionality (or cannot execute within the kernel space 20), and thus should execute within the user space 22. The load and execute engine 36 then loads the first section 32(0) into the kernel space 20 for execution by the kernel space bytecode interpreter 34, and concurrently executes the second section 32(X) using the user space bytecode interpreter 38. Execution of the first section 32(0) and the second section 32(X) continues until a termination condition (e.g., a received user input or a termination command) is encountered.

Figure 2:
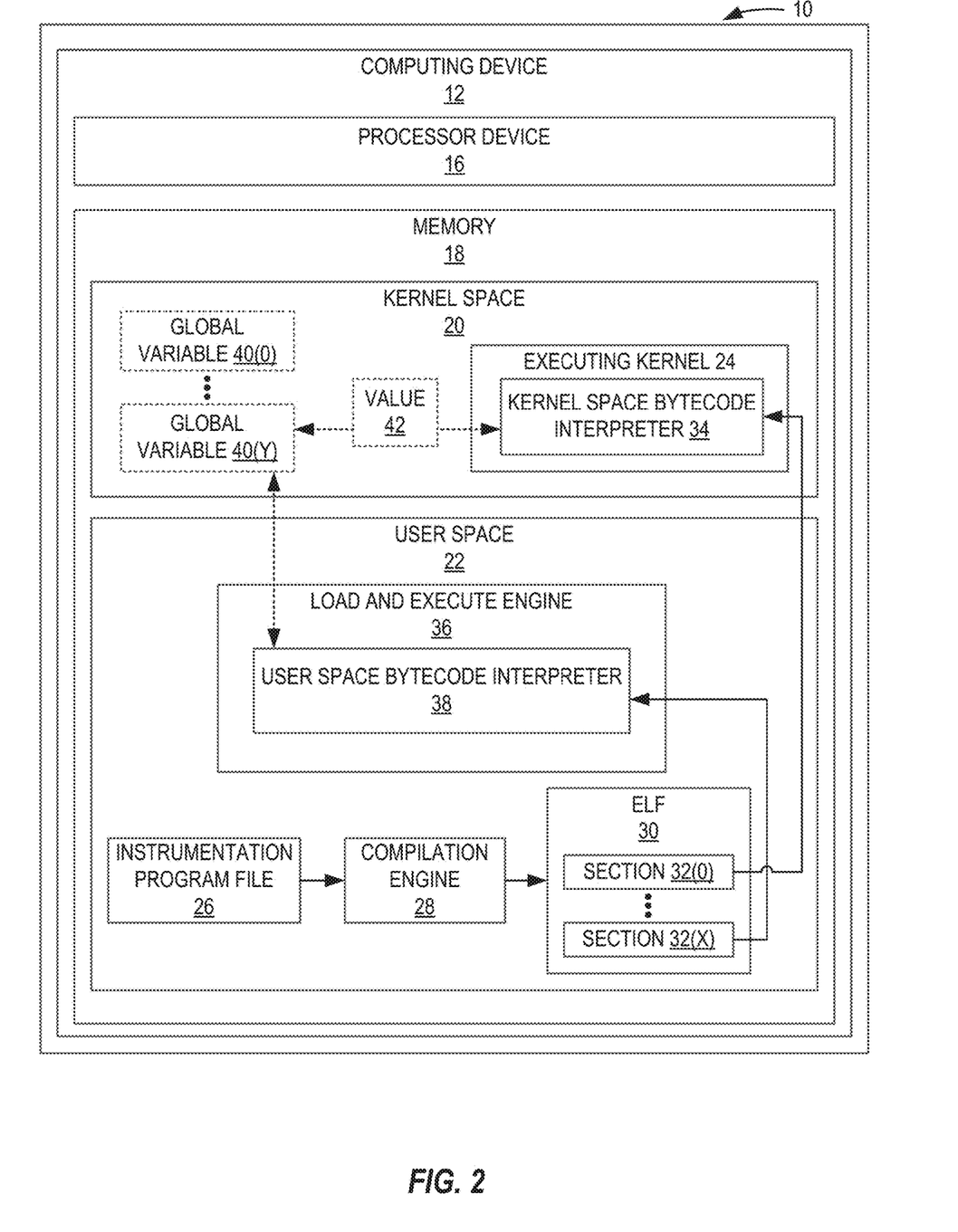
FIG. 2 is a block diagram of a system in which global variables are provided to facilitate data transfer between bytecode sections executing in kernel space and bytecode sections executing in user space, according to one example.

FIG. 2 illustrates additional elements according to some examples for enabling interoperability and data sharing between the sections 32(0), 32(X) of bytecode executing in the kernel space bytecode interpreter 34 and the user space bytecode interpreter 38. In FIG. 2, the processing system 10 of FIG. 1 and the constituent elements thereof are depicted. In addition, the load and execute engine 36 of FIG. 2 also provides one or more global variables 40(0)-40(Y) within the kernel space 20. The global variables 40(0)-40(Y) are accessible both from the kernel space 20 and the user space 22. The global variables 40(0)-40(Y) thus may be used to share data between the sections 32(0), 32(X) of bytecode during execution. For example, a value 42 may be received by the global variable 40(Y) from the kernel space bytecode interpreter 34, and subsequently may be provided to the user space bytecode interpreter 38.

In some examples, values stored in the global variables 40(0)-40(Y) may be subject to concurrent or interleaved reading and writing by concurrently executing bytecode sections 32(0)-32(X) (e.g., bytecode executing concurrently on multiple processor devices 16 and/or bytecode executing concurrently in the kernel space 20 and the user space 22). Accordingly, such examples may provide a concurrency control mechanism to provide atomicity for individual read and write operations performed on the global variables 40(0)-40(Y). As a non-limiting example, auxiliary global variables (such as eBPF global variables) may be provided to represent explicit read/write locks over one or more of the global variables 40(0)-40(Y).

Figure 3:
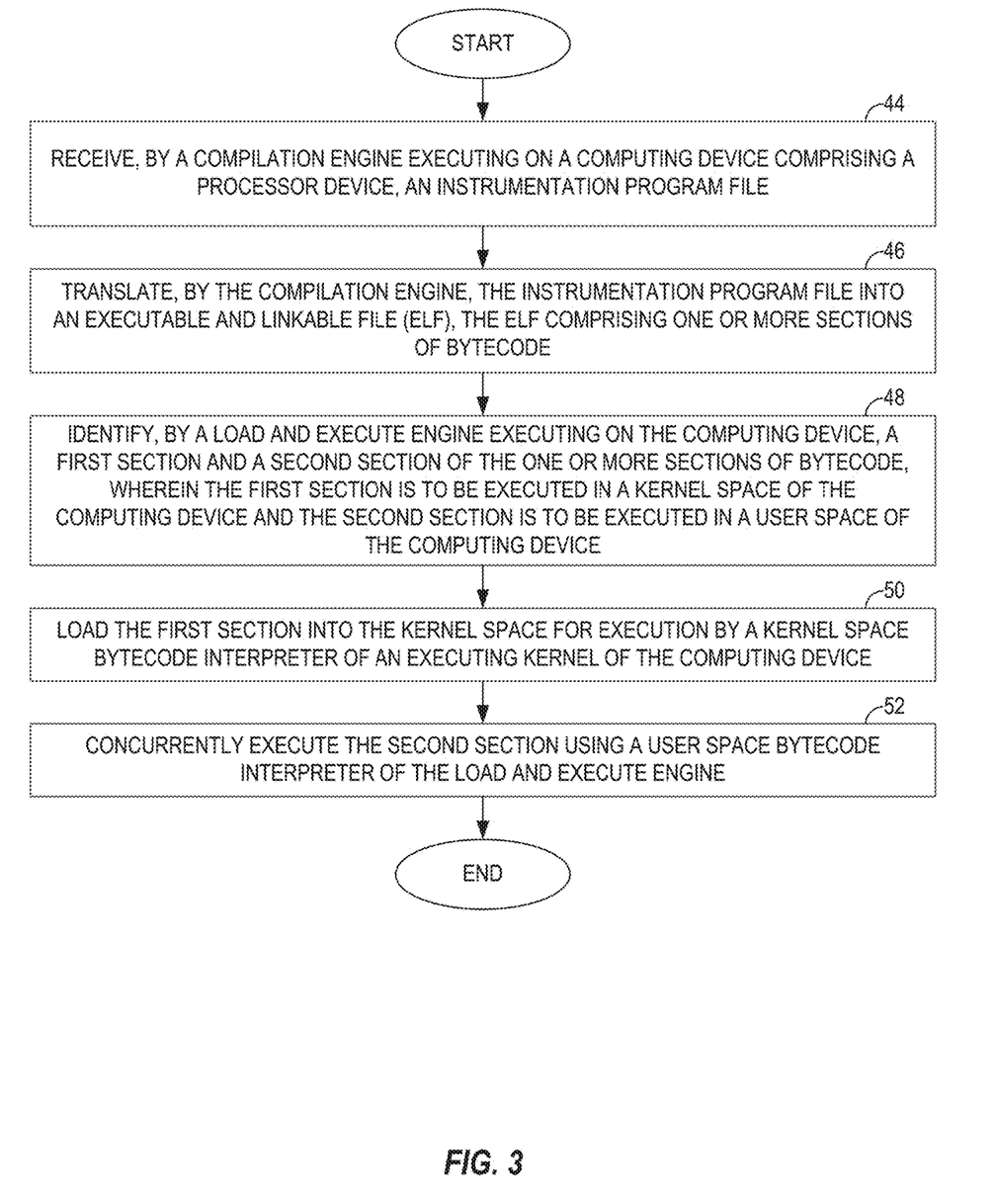
FIG. 3 is a flowchart of a method for providing dynamic instrumentation using domain-specific monitoring-language-to-kernel-bytecode compilation by the system of FIG. 1 according to one example.

To illustrate a method for providing dynamic instrumentation using domain-specific monitoring-language-to-kernel-bytecode compilation by the processing system 10 of FIG. 1 according to one example, FIG. 3 is provided. For the sake of clarity, elements of FIG. 1 are referenced in describing FIG. 3. Operations in FIG. 3 begin with the compilation engine 28 receiving an instrumentation program file 26 (block 44). The compilation engine 28 translates the instrumentation program file 26 into an ELF 30, the ELF 30 comprising one or more sections 32(0)-32(X) of bytecode (block 46).

The load and execute engine 36 then identifies a first section 32(0) and a second section 32(X) of the one or more sections 32(0)-32(X) of bytecode, wherein the first section 32(0) is to be executed in a kernel space 20 of the computing device 12 and the second section 32(X) is to be executed in a user space 22 of the computing device 12 (block 48). The load and execute engine 36 loads the first section 32(0) into the kernel space 20 for execution by a kernel space bytecode interpreter 34 of an executing kernel 24 of the computing device 12 (block 50). The load and execute engine 36 also concurrently executes the second section 32(X) using a user space bytecode interpreter 38 of the load and execute engine 36 (block 52).

Figure 4:
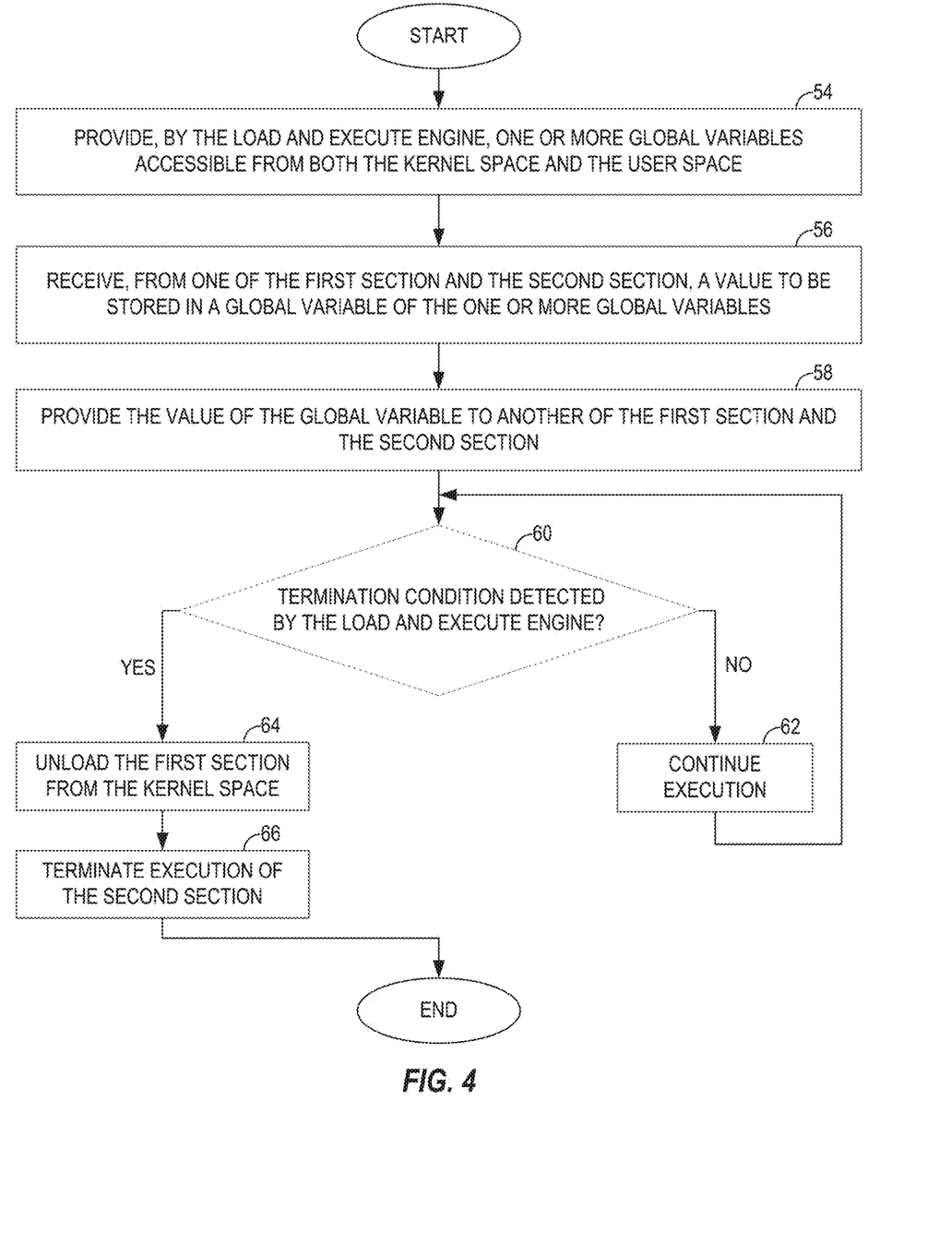
FIG. 4 is a flowchart illustrating additional operations for providing global variables and handling termination conditions by the system of FIG. 2 according to one example.

FIG. 4 is a flowchart illustrating additional operations for providing global variables and handling termination conditions by the processing system 10 of FIG. 2 according to one example. Elements of FIGS. 1 and 2 are referenced in describing FIG. 4 for the sake of clarity. It is to be understood that the operations illustrated in FIG. 4 may be carried out subsequent to the operations illustrated in FIG. 3. In FIG. 4, operations begin with the load and execute engine 36 providing one or more global variables 40(0)-40(Y) accessible from both the kernel space 20 and the user space 22 (block 54). The load and execute engine 36 may receive, from one of the first section 32(0) and the second section 32(X), a value 42 to be stored in a global variable (such as the global variable 40(0)) of the one or more global variables 40(0)-40(Y) (block 56). The load and execute engine 36 then may provide the value 42 of the global variable 40(0) to another of the first section 32(0) and the second section 32(X) (block 58).

The load and execute engine 36 may determine whether a termination condition has been detected (block 60). As noted above, the termination condition may include a received user input and/or a termination command provided by one of the sections 32(0)-32(X) of bytecode. If no termination condition is detected, execution continues (block 62). Processing then returns to block 60. However, if the load and execute engine 36 determines at decision block 60 that a termination condition has been detected, the load and execute engine 36 unloads the first section 32(0) from the kernel space 20 (block 64). The load and execute engine 36 then terminates execution of the second section 32(X) (block 66).

Figure 5:
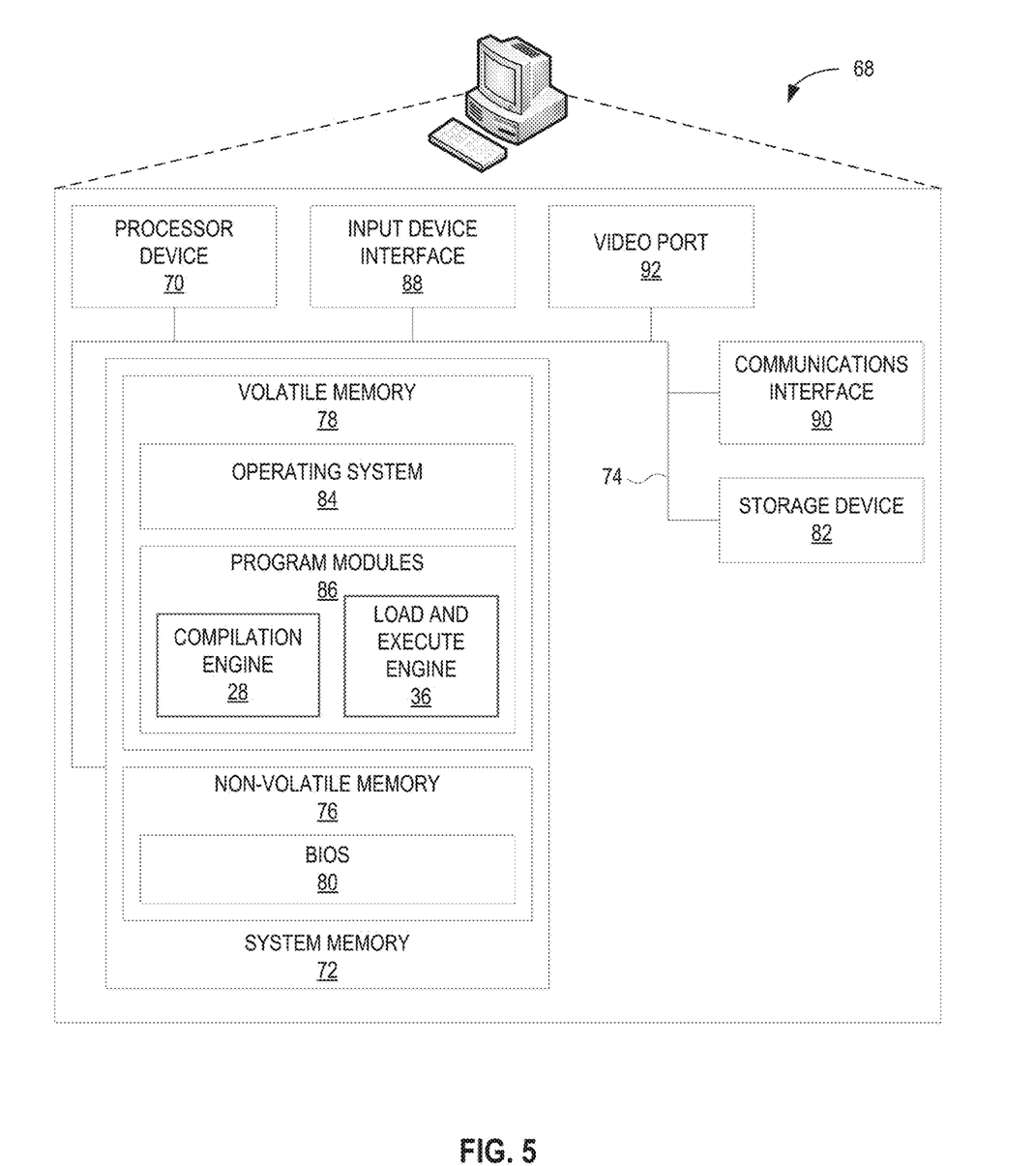
FIG. 5 is a block diagram of a computing device suitable for implementing examples according to one example.

FIG. 5 is a block diagram of a computing device 68, such as the computing device 12 of FIG. 1, suitable for implementing examples according to one example. The computing device 68 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 68 includes a processor device 70, a system memory 72, and a system bus 74. The system bus 74 provides an interface for system components including, but not limited to, the system memory 72 and the processor device 70. The processor device 70 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The system memory 72 may include non-volatile memory 76 (e.g., read-only memory (ROM), erasable ROM (EPROM), electrically EPROM (EEPROM), etc.), and volatile memory 78 (e.g., RAM). A basic input/output system (BIOS) 80 may be stored in the non-volatile memory 76 and can include the basic routines that help to transfer information among elements within the computing device 68. The volatile memory 78 may also include a high-speed RAM, such as static RAM, for caching data.

The computing device 68 may further include or be coupled to a non-transitory computer-readable storage medium such as a storage device 82, which may comprise, for example, an internal or external hard disk drive (HDD)

(e.g., enhanced integrated drive electronics (EIDE) or serial advanced technology attachment (SATA)), HDD (e.g., EIDE or SATA) for storage, flash memory, or the like. The storage device 82 and other drives associated with computer-readable media and computer-usable media may provide nonvolatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 82 and in the volatile memory 78, including an operating system 84 and one or more program modules 86 (including, for example, the compilation engine 28 and the load and execute engine 36 of FIG. 1), which may implement the functionality described herein in whole or in part. It is to be appreciated that the examples can be implemented with various commercially available operating systems 84 or combinations of operating systems 84.

A number of modules can be stored in the storage device 82 and in the volatile memory 78, including, by way of non-limiting example, the compilation engine 28 and the load and execute engine 36. All or a portion of the examples may be implemented as a computer program product stored on a transitory or non-transitory computer-usable or computer-readable storage medium, such as the storage device 82, which includes complex programming instructions, such as complex computer-readable program code, to cause the processor device 70 to carry out the steps described herein. Thus, the computer-readable program code can comprise software instructions for implementing the functionality of the examples described herein when executed on the processor device 70. The processor device 70 may serve as a controller, or control system, for the computing device 68 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 70 through an input device interface 88 that is coupled to the system bus 74 but can be connected by other interfaces, such as a parallel port, a serial port, a Universal Serial Bus (USB) port, an IR interface, and the like.

The computing device 68 may also include a communications interface 90 suitable for communicating with a network as appropriate or desired. The computing device 68 may also include a video port 92 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method for providing dynamic instrumentation of executing processes, comprising:
   receiving, by a compilation engine executing on a computing device comprising a processor device, an instrumentation program file comprising instructions for monitoring one or more executing processes;
   translating, by the compilation engine, the instrumentation program file into an executable and linkable file (ELF), the ELF comprising one or more sections of bytecode;
   analyzing, by a load and execute engine executing on the computing device, the ELF, and based on an analysis of the ELF:
      determining, by the load and execute engine, based on functionality specified by a first section of the one or more sections of bytecode that the first section requires a kernel functionality; and
      determining, by the load and execute engine, based on functionality specified by a second section of the one or more sections of bytecode that the second section does not require a kernel functionality, wherein the first section is to be interpreted by a kernel space bytecode interpreter of a kernel that is currently executing in a kernel space of the computing device and the second section is to be executed in a user space of the computing device;
   loading the first section into the kernel space for execution by the kernel space bytecode interpreter of the executing kernel of the computing device;
   executing the first section of bytecode by interpreting, by the kernel space bytecode interpreter in the kernel space, the first section of bytecode;
   concurrently executing the second section of bytecode using a user space bytecode interpreter of the load and execute engine;
   providing, by the load and execute engine, one or more global variables accessible from both the kernel space and the user space;
   receiving, from the second section of bytecode being interpreted by the user space bytecode interpreter, a value to be stored in a global variable of the one or more global variables; and
   providing the value stored in the global variable to the first section of bytecode being interpreted by the kernel space bytecode interpreter.

2. The method of claim 1, further comprising:
   detecting, by the load and execute engine, a termination condition; and
   responsive to detecting the termination condition:
      unloading the first section from the kernel space; and
      terminating execution of the second section.

3. The method of claim 2, wherein the termination condition comprises one of a received user input and a termination command from one of the first section and the second section.

4. The method of claim 1, wherein the kernel space bytecode interpreter comprises an extended Berkeley Packet Filter (eBPF) interpreter.

5. The method of claim 1, wherein the instrumentation program file comprises a SystemTap program file.

6. A computing device, comprising:
   a memory; and
   a processor device coupled to the memory to:
      receive, using a compilation engine, an instrumentation program file comprising instructions for monitoring one or more executing processes;
      translate, using the compilation engine, the instrumentation program file into an executable and linkable file (ELF), the ELF comprising one or more sections of bytecode;
      analyze, by a load and execute engine executing on the computing device, the ELF, and based on an analysis of the ELF:

determine, by the load and execute engine, based on functionality specified by a first section of the one or more sections of bytecode that the first section requires a kernel functionality; and determine, by the load and execute engine, based on functionality specified by a second section of the one or more sections of bytecode that the second section of the one or more sections of bytecode does not require a kernel functionality, wherein the first section is to be interpreted by a kernel space bytecode interpreter of a kernel that is currently executing in a kernel space of the computing device and the second section is to be executed in a user space of the computing device;

load the first section into the kernel space for execution by the kernel space bytecode interpreter of the executing kernel of the computing device;

execute the first section of bytecode by interpreting, by the kernel space bytecode interpreter in the kernel space, the first section of bytecode;

concurrently execute the second section of bytecode using a user space bytecode interpreter of the load and execute engine;

provide, by the load and execute engine, one or more global variables accessible from both the kernel space and the user space;

receive, from the second section of bytecode being interpreted by the user space bytecode interpreter, a value to be stored in a global variable of the one or more global variables; and provide the value stored in the global variable to the first section of bytecode being interpreted by the kernel space bytecode interpreter.

7. The computing device of claim 6, wherein the processor device is further to:

detect, using the load and execute engine, a termination condition; and responsive to detecting the termination condition:
unload the first section from the kernel space; and
terminate execution of the second section.

8. The computing device of claim 7, wherein the termination condition comprises one of a received user input and a termination command from one of the first section and the second section.

9. The computing device of claim 6, wherein the kernel space bytecode interpreter comprises an extended Berkeley Packet Filter (eBPF) interpreter.

10. The computing device of claim 6, wherein the instrumentation program file comprises a SystemTap program file.

11. A computer program product for providing dynamic instrumentation of executing processes, the computer program product stored on a non-transitory computer-readable storage medium and including instructions to cause a processor device to:

receive an instrumentation program file comprising instructions for monitoring one or more executing processes;

translate the instrumentation program file into an executable and linkable file (ELF), the ELF comprising one or more sections of bytecode;

analyze, by a load and execute engine executing on the computing device, the ELF, and based on an analysis of the ELF:

determine, by the load and execute engine, based on functionality specified by a first section of the one or more sections of bytecode that the first section requires a kernel functionality; and determine, by the load and execute engine, based on functionality specified by a second section of the one or more sections of bytecode that the second section of the one or more sections of bytecode does not require a kernel functionality, wherein the first section is to be interpreted by a kernel space bytecode interpreter of a kernel that is currently executing in a kernel space of a computing device and the second section is to be executed in a user space of the computing device;

load the first section into the kernel space for execution by the kernel space bytecode interpreter of the executing kernel of the computing device;

execute the first section of bytecode by interpreting, by the kernel space bytecode interpreter in the kernel space, the first section of bytecode;

concurrently execute the second section of bytecode using a user space bytecode interpreter of the load and execute engine;

provide, by the load and execute engine, one or more global variables accessible from both the kernel space and the user space;

receive, from the second section of bytecode being interpreted by the user space bytecode interpreter, a value to be stored in a global variable of the one or more global variables; and provide the value stored in the global variable to the first section of bytecode being interpreted by the kernel space bytecode interpreter.

12. The computer program product of claim 11, including instructions to cause the processor device further to:

detect a termination condition; and responsive to detecting the termination condition:
unload the first section from the kernel space; and
terminate execution of the second section.

13. The computer program product of claim 12, wherein the termination condition comprises one of a received user input and a termination command from one of the first section and the second section.

14. The computer program product of claim 11, wherein the kernel space bytecode interpreter comprises an extended Berkeley Packet Filter (eBPF) interpreter.

15. The computer program product of claim 11, wherein the instrumentation program file comprises a SystemTap program file.

* * * * *